United States Patent
Burland

[11] 3,757,108
[45] Sept. 4, 1973

[54] EMERGENCY WARNING LIGHT
[76] Inventor: Oliver J. Burland, 214 Rugley Rd., Western Spring, Ill.
[22] Filed: July 6, 1971
[21] Appl. No.: 159,871

[52] U.S. Cl. ................ 240/46.59, 40/77, 240/1 R, 240/7.1 R, 240/49
[51] Int. Cl. .............................................. F21v 9/08
[58] Field of Search .............. 240/46.59, 1 R, 49, 240/22, 23, 24, 7.1 R, 7.5, 10.1, 106, 106.1, 52.1; 292/256.63, 256.6, 301, 303; 340/107, 108, 50; 40/77

[56] References Cited
UNITED STATES PATENTS

| | | | |
|---|---|---|---|
| 3,075,311 | 1/1963 | Maillette | 40/77 X |
| 3,105,315 | 10/1963 | Snethen | 40/77 |
| 1,740,845 | 12/1929 | Tilbe | 240/49 X |
| 3,271,735 | 9/1966 | Gosswiller | 240/49 X |
| 963,082 | 7/1910 | Shreve | 292/303 X |
| 3,117,302 | 1/1964 | Cardarelli | 240/49 X |
| 2,762,994 | 9/1956 | Kennelly | 340/50 |
| 2,719,282 | 9/1955 | Roth | 340/50 X |

*Primary Examiner*—Richard L. Moses
*Attorney*—Dawson, Tilton, Fallon & Lungmus

[57] ABSTRACT

An emergency warning light for vehicles wherein a plastic globe is secured to a plastic base for mounting atop the vehicle, the globe and base being connected by a unique detent locking arrangement and wherein the transparent globe is equipped with internal rib means for the receipt of placards to develop different visual images.

6 Claims, 11 Drawing Figures

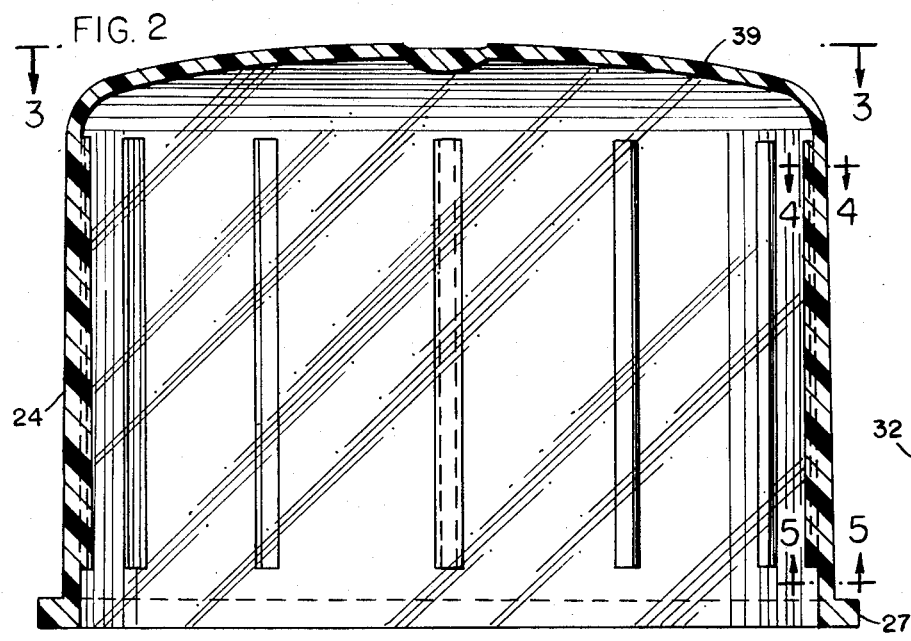
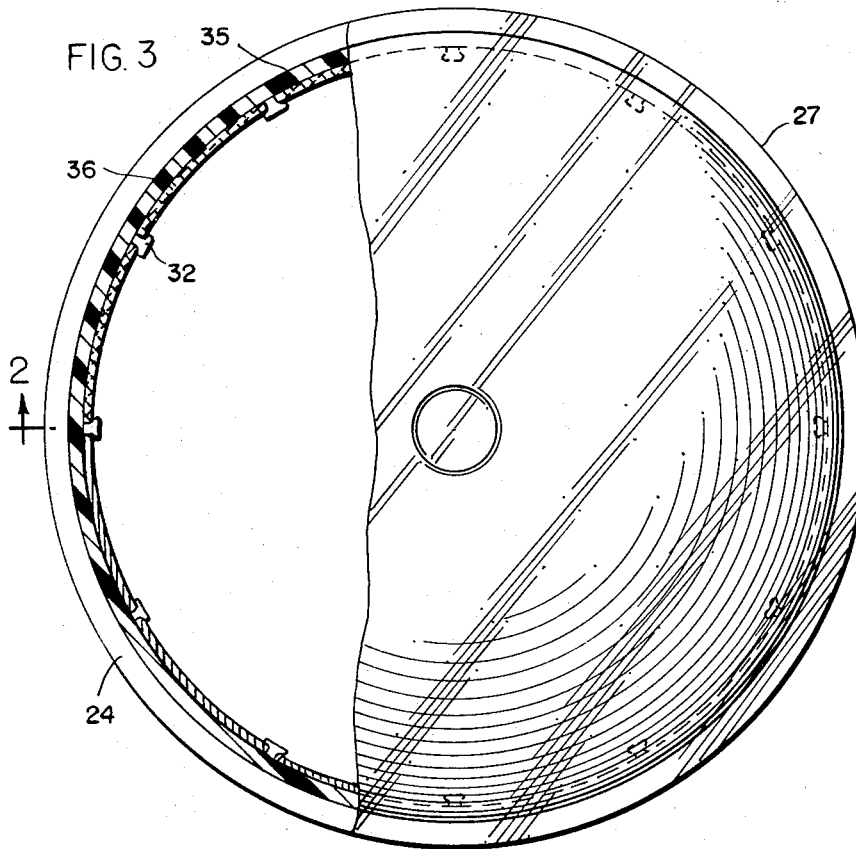
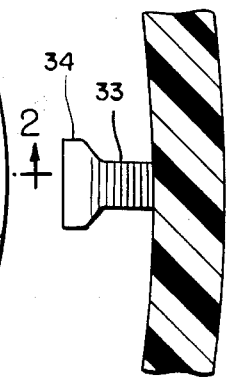

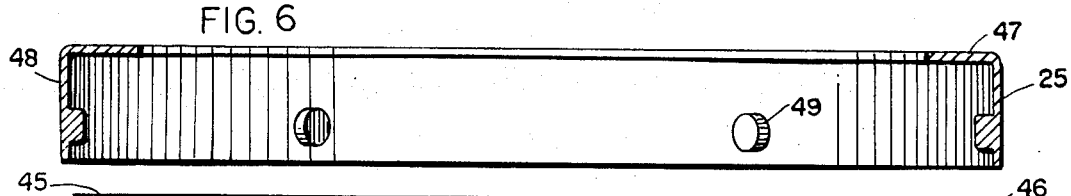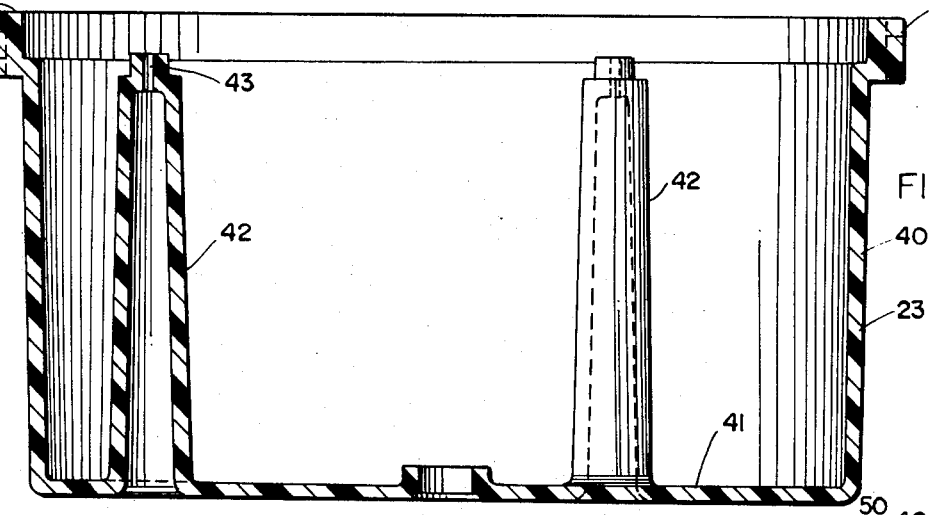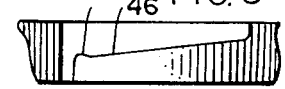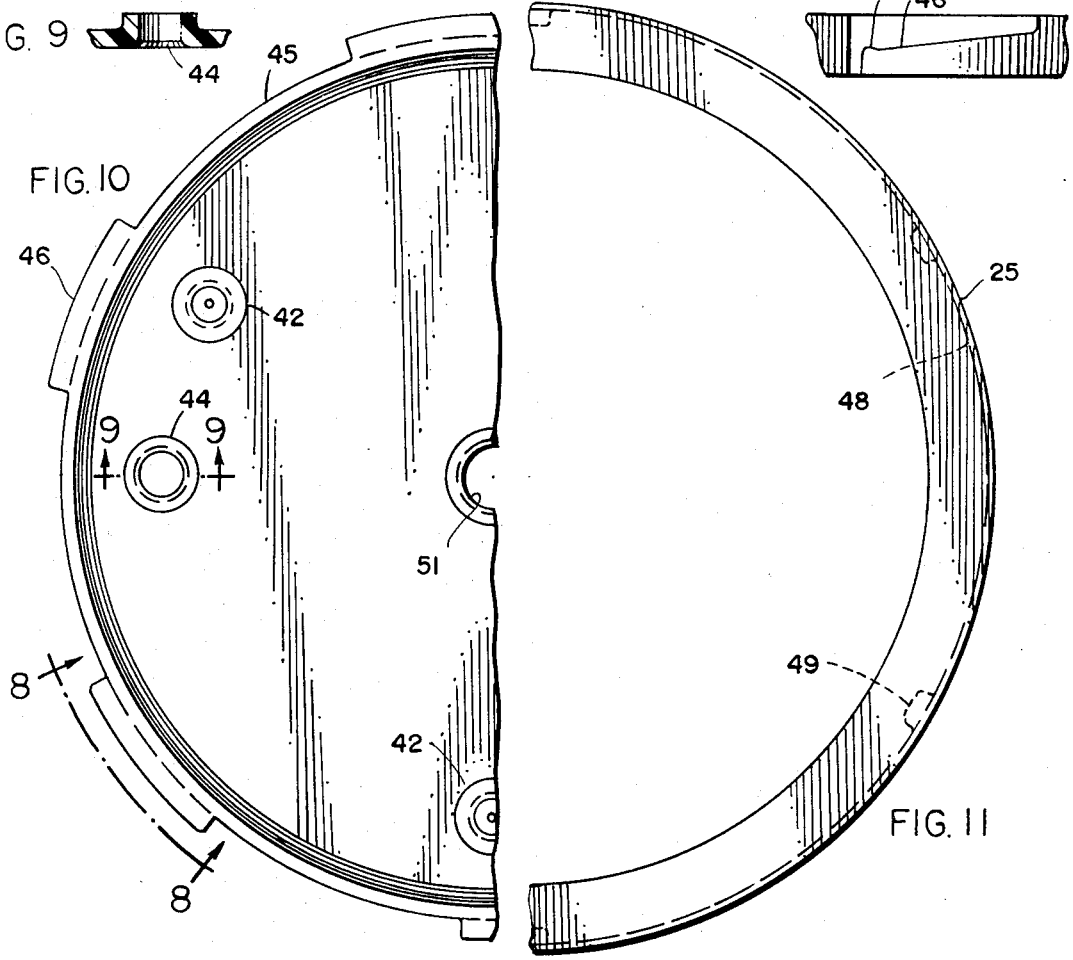

3,757,108

EMERGENCY WARNING LIGHT

BACKGROUND AND SUMMARY OF INVENTION

Emergency warning lights are uniformly installed atop such municipally operated vehicles as fire engines and trucks, police cars and ambulances. Increasingly, however, such lights are mounted on private vehicles such as insurance investigation automobiles, tow trucks, etc. The latter class of vehicles are normally not permitted to operate at high speeds and thus it is desirable to be able to readily distinguish between the two type of vehicles. Inasmuch as the latter class of vehicles may adopt a variety of warning indicia, it is important that considerable flexibility and latitude be given to municipally operated vehicles in distinguishing themselves. This is achieved through the instant invention where the globe portion of the signal light can be readily changed to present a signal readily distinguishable from non-emergency vehicles. Through the provision of unique interior rib means, the beam or other indicia presented by the lights within the globe can be changed to meet local conditions.

Cooperating with the globe to facilitate change over of characteristic is a unique base and lock ring arrangement provided as part of the inventive light. This unique arrangement of parts is advantageous aside and apart from the novel use discussed above. The construction of the light, particularly the base and mounting ring achieves inexpensive yet rugged and reliable construction and operation. The provision of all of the foregoing constitute important objectives of this invention.

The invention is described in conjunction with an illustrative embodiment in the accompanying drawing, in which —

FIG. 2 is a vertical sectional view of the globe portion of FIG. 1;

FIG. 3 is a top plan view partially in section of the globe of FIG. 2 such as would be seen along the sight line 3—3 applied to FIG. 2;

Figure 1:
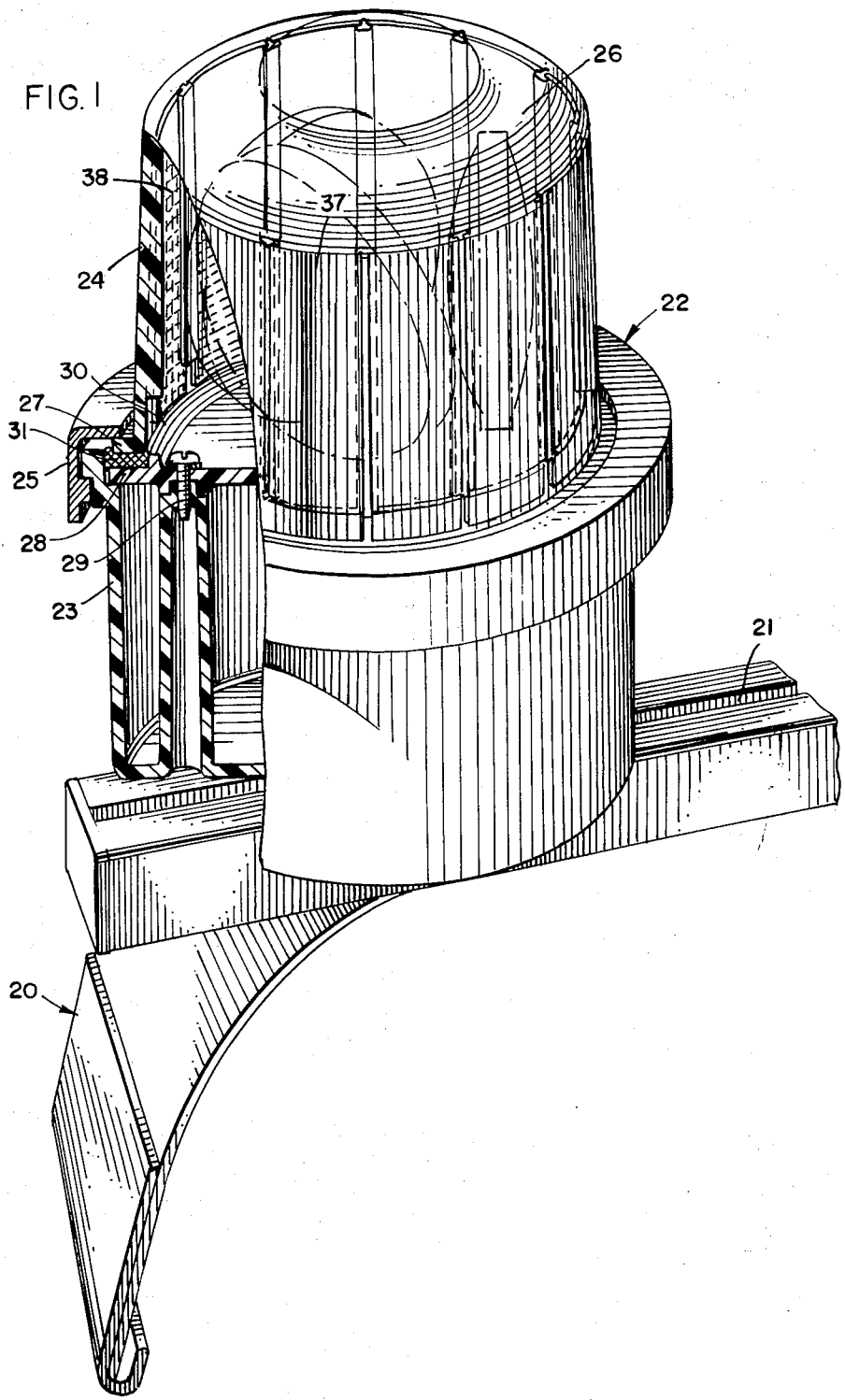
FIG. 1 is a fragmentary perspective view, partially broken away of the inventive emergency warning light shown installed on a roof mounting bar.

FIGS. 4 and 5 are enlarged fragmentary sectional views taken along the lines 4—4 and 5—5 as applied to FIG. 2;

FIG. 6 is a diametral sectional view through the mounting ring portion of FIG. 1;

FIG. 7 is a sectional view taken through the base portion of FIG. 1;

FIG. 8 is an enlarged fragmentary side elevational view of one of the mounting ramps as seen along the line 8—8 applied to FIG. 10;

FIG. 9 is a fragmentary sectional view seen along the line 9—9 of FIG. 10;

FIG. 10 is a fragmentary top plan view of the base of FIG. 7; and

FIG. 11 is a fragmentary top plan view of the mounting ring of FIG. 6.

In the illustration given and with reference first to FIG. 1, the numeral 20 designates generally a mounting bar which is adapted for installation over the roof of an emergency vehicle such as a fire truck, police car, etc. The bar 20 is equipped with a longitudinally extending groove 21 which is adapted to receive bolt means (not shown) for securing the light fixture generally designated 22 in place. Further details of construction of the bar 20 can be found in my co-pending application Ser. No. 886,829 filed Dec. 22, 1969.

The light 22 is seen to include a base 23 on which is removably mounted a transparent globe 24 and the two elements 23 and 24 being releasably locked together by means of a clamping or locking ring 25. The numeral 26 designates sealed beam lamps positioned for oscillation or rotation within the light 22 and which direct beams through the globe 24 so as to alert a viewer to the approach of the vehicle. Inasmuch as the instant invention is not concerned with any particular type of light source structure, a variety of such may be employed. One such suitable construction is a three lamp arrangement seen in co-owned U.S. Pat. No. 2,762,994.

Referring now to FIGS. 2–5, the details of the globe 24 will now be described. In the illustrative embodiment, the globe or dome 24 is constructed of plastic material such as an acrylic plastic. However, a wide variety of materials of construction may be employed. I have found it particularly advantageous to utilize materials which are transparent although in some instances slightly opaque or translucent materials of construction may be employed. A typical dome or globe has a bottom diameter of the order of 7¾ inches and a height of 5⅝ inches. The globe 24 is equipped with an integral perimetric flange as at 27 which, as can be seen from a consideration of FIG. 1 is supported on a mounting plate 28 provided as the top closure for the base 23.

Still referring to FIG. 1, it will be seen that the mounting plate 28 which is disposed generally horizontally, is secured to the base 23 by means of screws 29. Advantageously the plate may be equipped with an annular upstanding integral flange 30 which provides a means for positioning a gasketing ring 31 upon which the perimetric flange 27 rests. The globe 24 is urged downwardly against the mounting plate 28 and thus aginst the base 23 by means of the locking ring 25 — the details of which will be described hereinafter.

Referring again to the second sheet of drawings, the numeral 32 designates rib means provided integral with and on the interior of the globe 24. In the illustration given, the rib means 32 have a cross sectional form of a T consisting of a base portion 33 (see FIG. 5) and a bar portion 34. As one proceeds downwardly within the globe, the rib means 32 projects further radially inwardly as can be appreciated from a comparison of the showings in FIGS. 4 and 5.

As can be seen in FIG. 3, placards as at 35, 36, etc. are interposed between adjacent rib means 32 and these can be utilized to change the character of the light beam emanating from the lamps 26. For example and with reference to FIG. 1, the placard designated 37 in the front of the globe 24 is constructed of red transparent film. On the other hand, the placard 38 which is essentially at the rear of the globe 24 is constructed of an amber transparent film so that a viewer in front of the vehicle will see a red color while one to the rear will see the amber color. It will be appreciated that the placards installed between adjacent rib means may take the form of a wide variety of color filters or even may be partially opaque so as to create different visual impressions. Placards forming the letters "P" and "D" can be installed so as to clearly apprise the viewer that a police emergency vehicle is approaching. Through the cooperation of the adjoining rib means 32 a wide variety of placards can be installed as desired and installation is facilitated by the tapered character of the rib means 32 so that when placards are inserted and shoved between adjacent bar portions 34 toward the roof 39 of the globe 24 (see FIG. 2), the placards are automatically cinched in place.

Referring now to the third sheet of the drawing, the base 23 is seen in diametral section in FIG. 7. Advantageously, the base also may be constructed of plastic and further may be chrome plated so as to obscure the various parts housed there within. In the case of a globe of the dimensions previously referred to, I find it advantageous to provide a base having a diameter of the order of about 8¼ inches and a height of the order of 4½ inches. The base 23 is seen to have a generally cylindrical sidewall 40 integral with a generally flat bottom wall 41. The bottom wall 41 is interrupted to provide integral upstanding supports as at 42. Three such supports 42 are provided in the illustrative embodiment, spaced apart 120 degrees. The supports 42 provide the means for supporting the mounting plate 28 (see FIG. 1) through the introduction of the screws 29 into the cored openings 43. Normally, the screws 29 are of the self-tapping variety so that the mounting plate 28 is readily installed.

The bottom wall 41 is also interrupted at diametrically opposed portions to provide mounting openings 44 as seen in FIGS. 9 and 10. The openings 44 are employed for the receipt of the previously mentioned bolt means (not shown) which connect the base 23 with the groove 21 of the mounting bar 20.

The upper outer edge of the base 23 is equipped with a perimetric flange 45 which is integral with the base 23. In the illustration given, the flange 25 is equipped at 6 equally spaced portions in the circumference thereof with ramps generally designated 46 — see FIG. 8 in particular. Cooperating with the ramps is the previously mentioned locking ring 25 which can be seen in FIG. 6. The locking ring 25 has a generally cylindrical sidewall integral with a partial top wall as at 47. The generally sidewall of the locking ring 25 is designated 48 and is seen to be equipped with 6 inwardly projecting integral lugs 49. As the locking or retainer ring 25 is rotated in place on the flange 45, the projections 49 ride down the ramps 46 until a detent surface 50 (see FIG. 8) is reached wherein the projections 49 repose substantially resistive to dislodgment. In the illustration given and in conjunction with the previously identified dimensions, the retainer ring 25 is advantageously constructed of 16 gauge steel having a height slightly under 1 inch and a diameter of the order of 8¾ inches.

It will be appreciated that even though installed in place as seen in FIG. 1, the light 22 can be partially dismantled quite readily so as to remove the globe 24 and repair or replace any particular one or group of placards 35–38. This is achieved merely by rotating the retainer ring 25 to disengage the projections 49 from their stable positions within the detents 50 whereupon the projections ride up the ramps 46 permitting the ring 25 to be lifted upwardly along with the globe 24 for further work. Further, the entire light assembly is readily installable, the base being conveniently and quickly attached to the mounting bar 21 through the insertion of suitable bolt means through the opening 44 (see FIG. 9) into the slot 21 (see FIG. 1). Thereafter, the mounting plate 28 which carries the lamps 26 and the usual rotating or oscillating motor can be installed on the base 23 in the fashion seen in FIG. 1. The central opening 51 (see FIG. 10) is provided for the electrical conduit leading from the interior of the vehicle to the motor (not shown) but housed within the base 23 and supported by the mounting plate 28. Thereafter, the self-tapping screws 29 are installed into the cored supports 42 as seen in FIG. 1 and the gasket 31, globe 24 and retainer ring quickly installed.

I claim:

1. An emergency signal light comprising a base adapted to be mounted atop an emergency vehicle and having lamp means positioned thereabove, a generally transparent plastic dome mounted on said base and enclosing said lamp means, said dome having a generally circular sidewall integral with a top wall, a plurality of circumferentially spaced vertically extending rib means integral with said sidewall on the interior of said dome and adapted to support light beam modifying placards, and means on said base for mounting said base atop an emergency vehicle in non-rotatable fashion.

2. The structure of claim 1 in which said base is essentially cup-shaped having an arcuate sidewall integral with a bottom wall, a plurality of integral supports upstanding from said bottom wall within said cup-shape to provide support for said lamp means.

3. The structure of claim 1 in which said base is generally cup-shaped having an arcuate sidewall and circumferentially spaced apart integral flanges projecting outwardly from the upper sidewall, said flanges being equipped with detent means, and a retainer ring equipped with detent-fitting projections mounted on said base in engagement with said dome and said flanges.

4. An emergency signal light comprising a base adapted to be mounted atop an emergency vehicle and having lamp means positioned thereabove, a generally transparent plastic dome on said base and enclosing said lamp means, and a retainer ring releasably clamping said dome and base together, said dome being mounted on said base and having a perimetric flange, said base having a plurality of outwardly facing detent-equipped ramps adjacent the top thereof, said retainer ring being constructed and arranged to cooperate with said ramp detents in releasably clamping said dome to said base, said dome being equipped on the interior thereof with a plurality of perimetrically spaced apart means for mounting color filter means.

5. An emergency signal light comprising a base adapted to be mounted atop an emergency vehicle and having lamp means positioned thereabove, a generally transparent plastic dome mounted on said base and enclosing said lamp means, said dome having a generally circular sidewall integral with a top wall, said dome being equipped on the interior thereof with a plurality of perimetrically spaced apart means for mounting color filter means, and means on said base for mounting said base atop an emergency vehicle in non-rotatable fashion.

6. An emergency signal light comprising a base adapted to be mounted atop an emergency vehicle and having lamp means positioned thereabove, a generally transparent plastic dome mounted on said base and enclosing said lamp means, said dome having a generally circular sidewall integral with a top wall, and a plurality of circumferentially spaced vertically extending rib means integral with said side wall on the interior of said dome and adapted to support light beam modifying colored films, each rib means having a width substantially less than the width of the film, said dome being formed of substantially clear plastic whereby light from said lamp means passes through relatively wide colored films and relatively narrow strips of substantially clear plastic, and means on said base for mounting said base atop an emergency vehicle in non rotatable fashion.

* * * * *